United States Patent [19]

Hagerman et al.

[11] 4,314,631

[45] Feb. 9, 1982

[54] FRICTIONAL BELT BRAKE

[75] Inventors: Enoch R. Hagerman, Ligonier, Ind.;
Richard H. Walkden, Buchanan, Mich.

[73] Assignee: Uniment Systems, Inc., South Bend, Ind.

[21] Appl. No.: 123,743

[22] Filed: Feb. 22, 1980

[51] Int. Cl.³ .............................................. B65G 43/06
[52] U.S. Cl. ................................... 198/856; 188/65.1; 188/82.8; 226/148; 226/149
[58] Field of Search ............... 198/502, 854, 856, 323; 188/65.1, 82.8, 82.84, 136; 226/147-150

[56] References Cited

U.S. PATENT DOCUMENTS

| 688,795 | 12/1901 | Scott | 188/136 |
| 1,437,718 | 12/1922 | Burns | 198/854 |

FOREIGN PATENT DOCUMENTS

| 291852 | 1/1971 | U.S.S.R. | 198/856 |
| 361946 | 11/1972 | U.S.S.R. | 198/856 |
| 630160 | 10/1978 | U.S.S.R. | 198/854 |

*Primary Examiner*—Joseph E. Valenza
*Attorney, Agent, or Firm*—Oltsch, Knoblock & Hall

[57] ABSTRACT

A brake device which is used to prevent reverse movement of a belt run and which includes a wedge member which is pivotally supported above the belt run. Upon reverse movement of the belt run, the wedge member is drawn into pinching contact with the belt.

5 Claims, 11 Drawing Figures

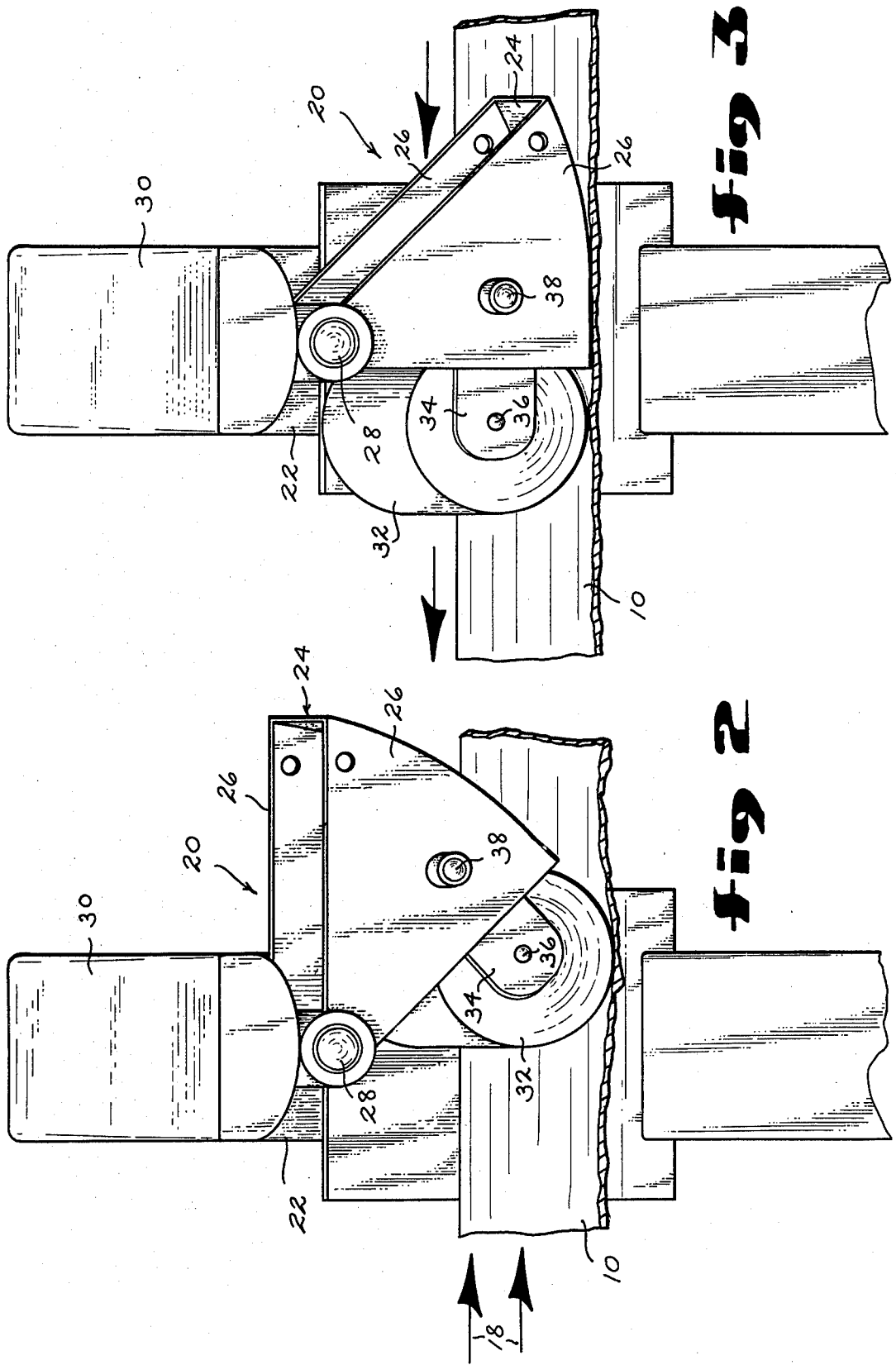

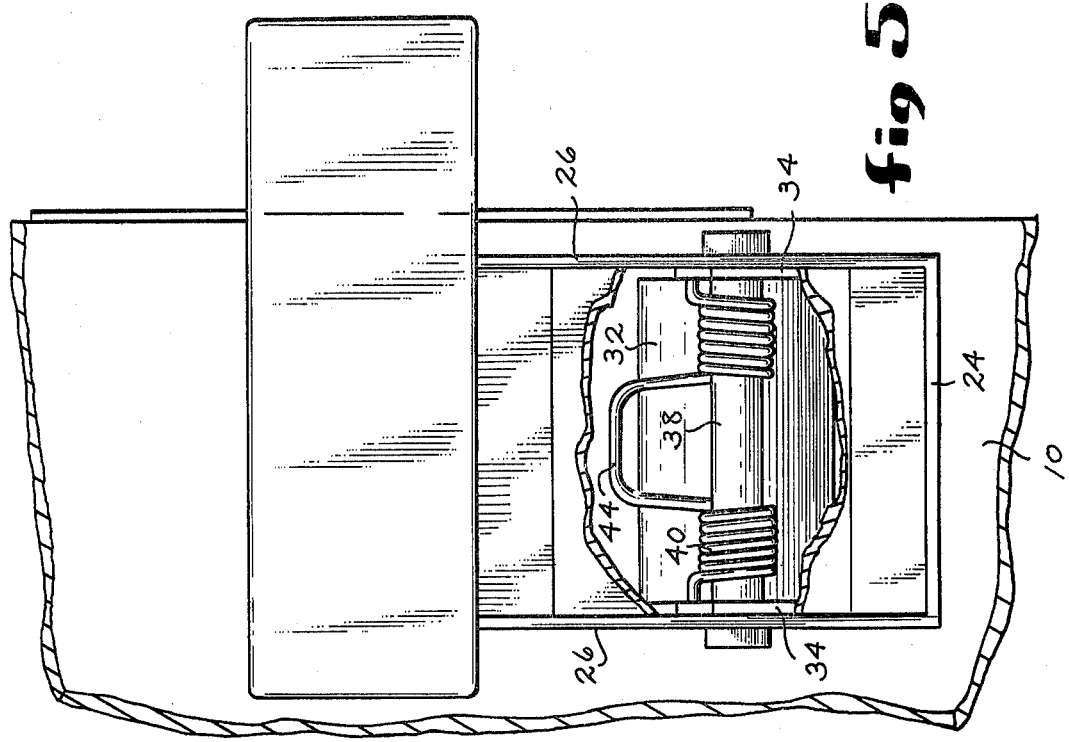
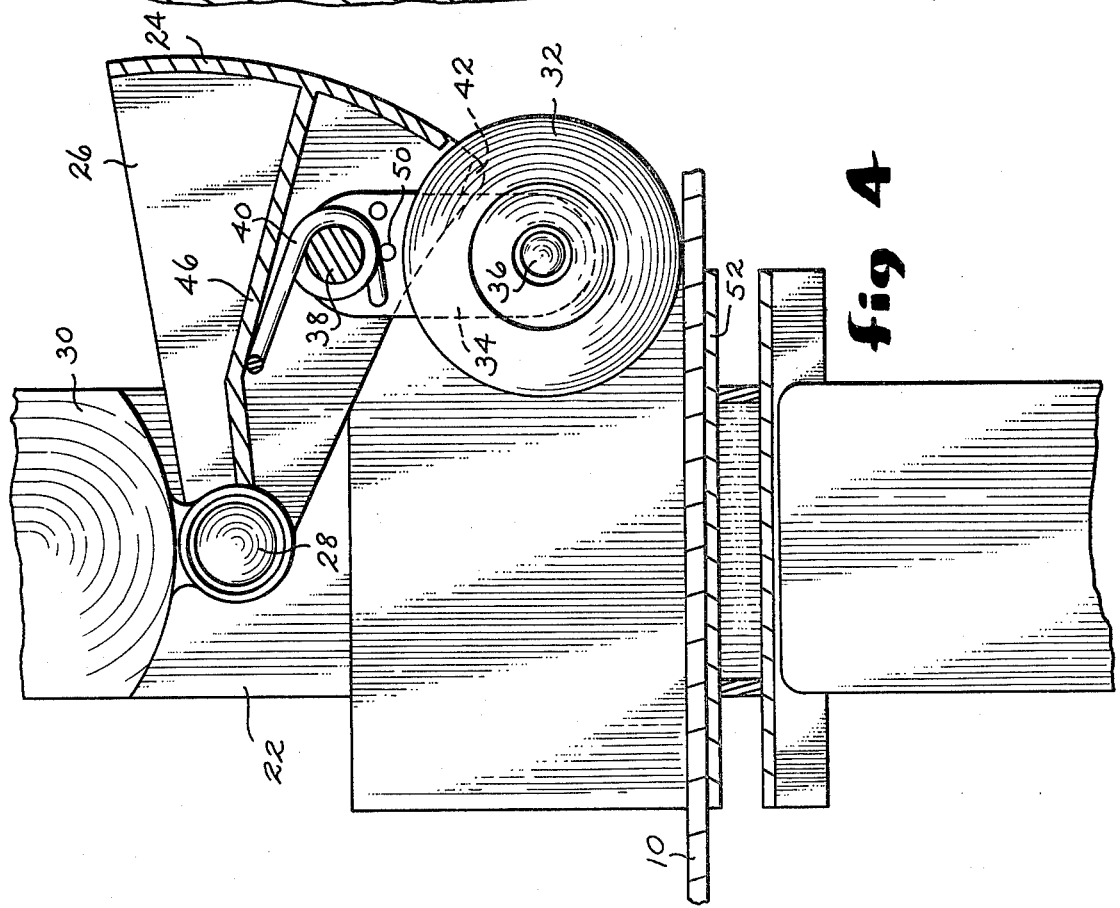

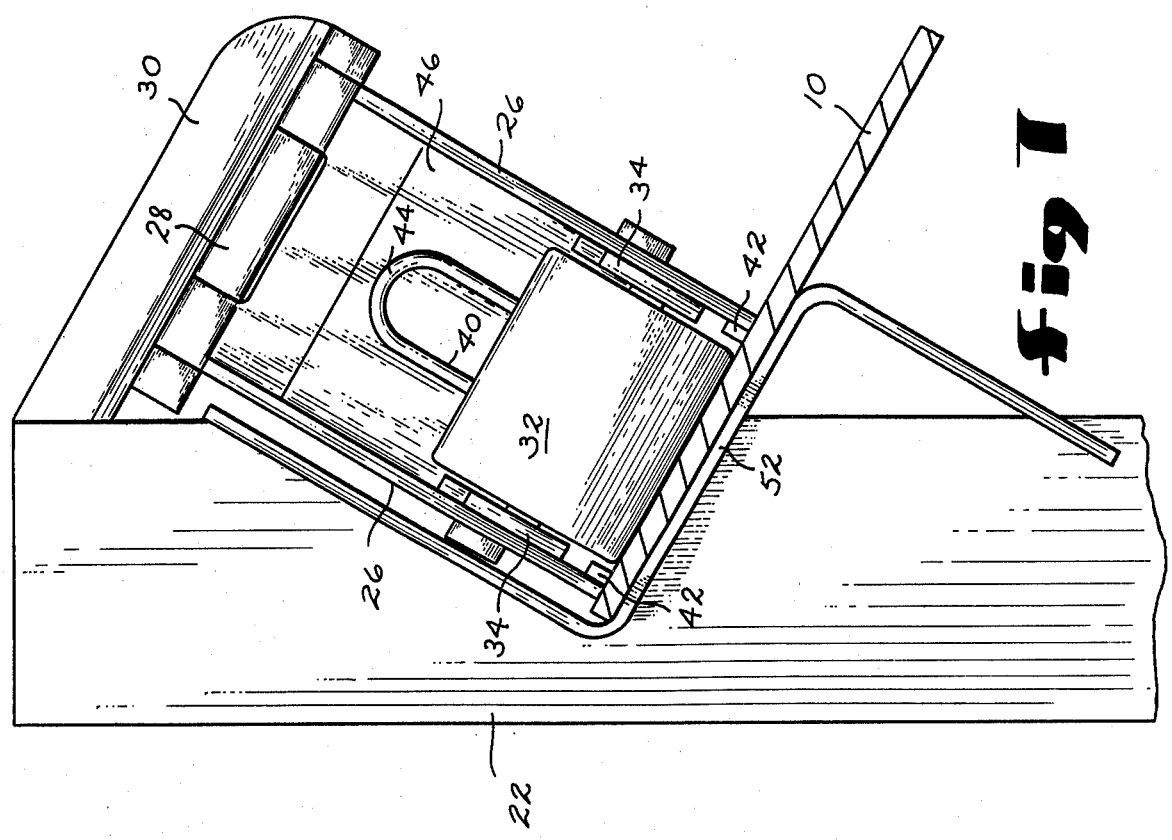
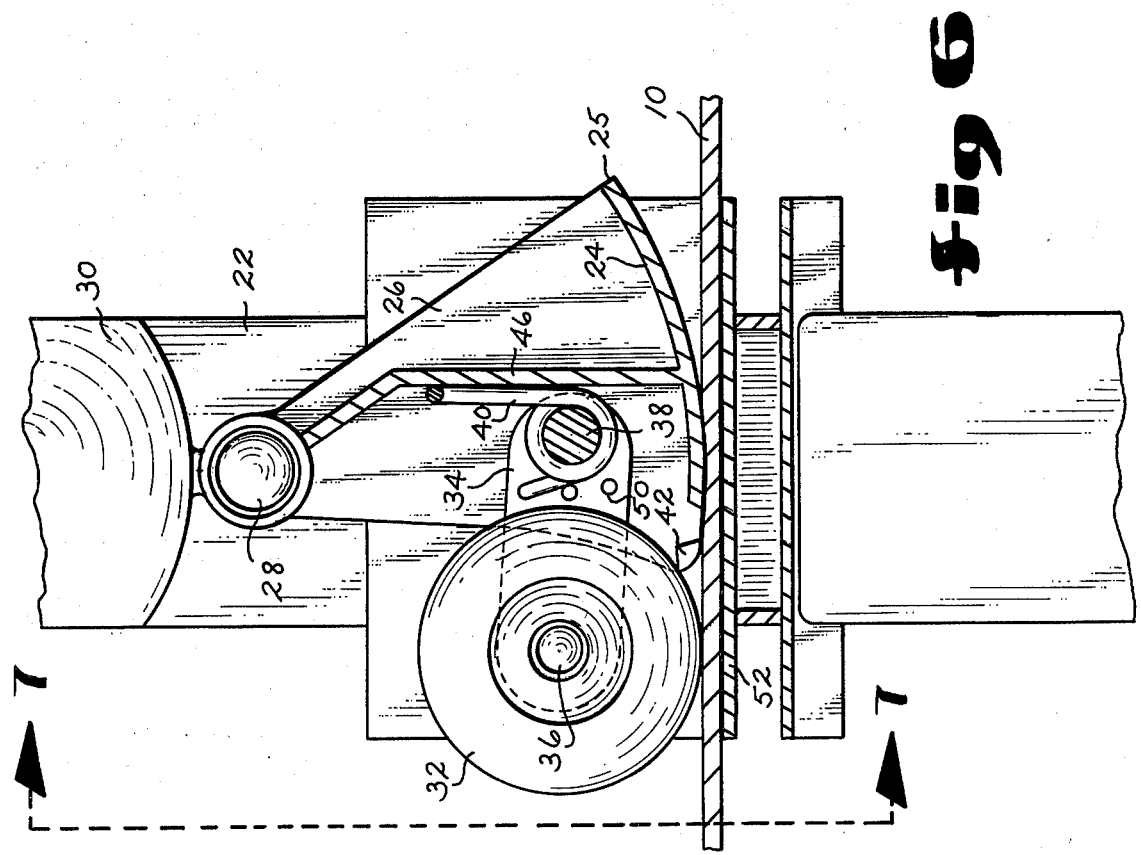

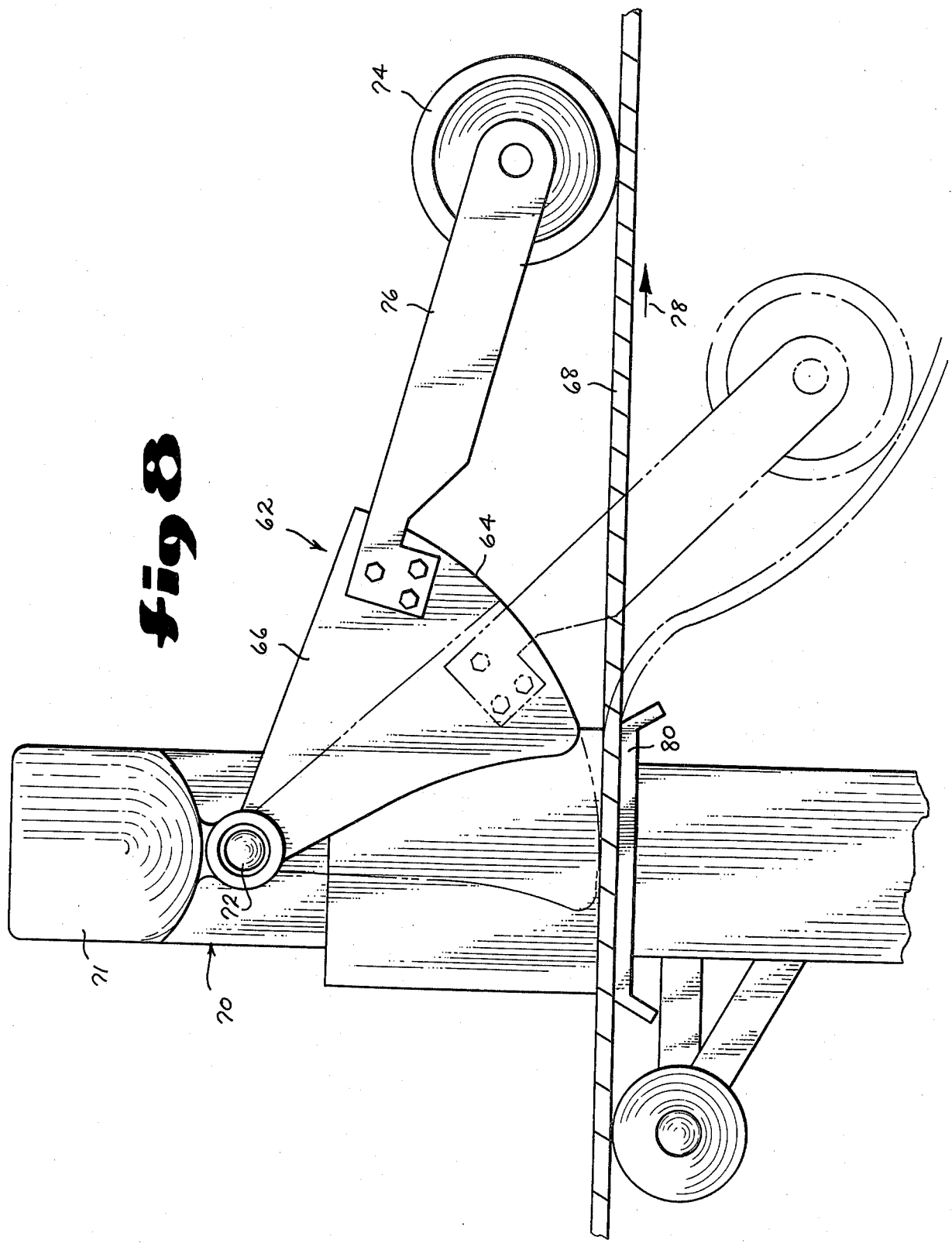

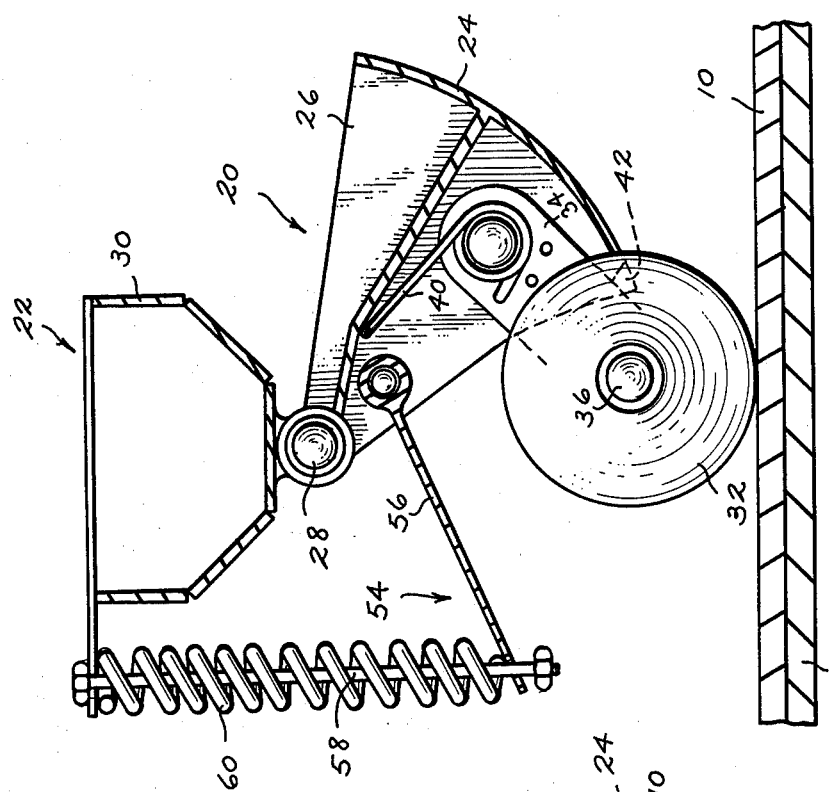
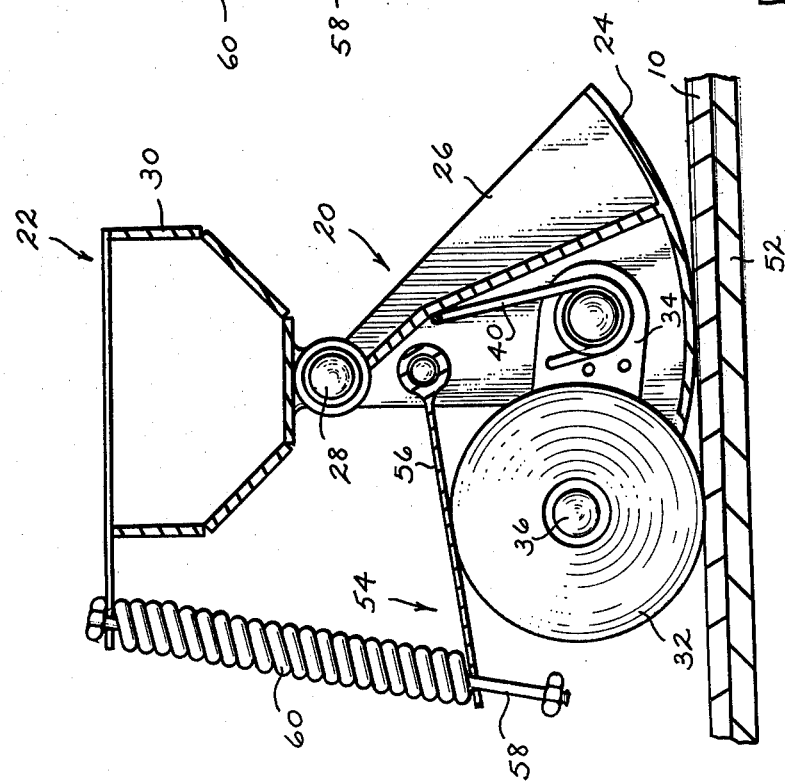

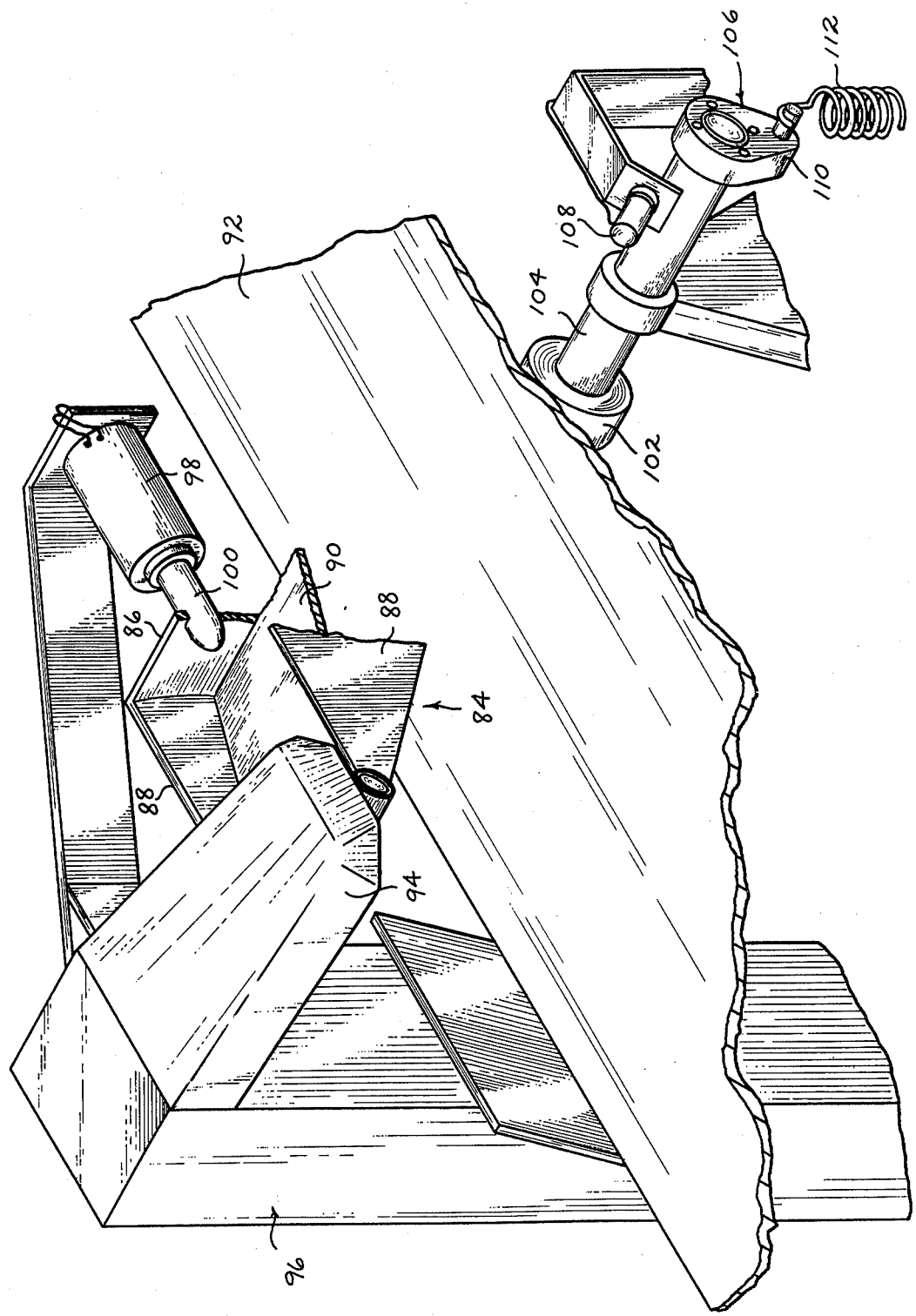

FRICTIONAL BELT BRAKE

SUMMARY OF THE INVENTION

This invention relates to a brake device for preventing undesired reverse movement of a run of a conveyor or similar type belt.

Heretofore, the breakage or separation of elevated conveyor belts caused that portion of the run of the belt below the place of breakage or separation to experience reverse movement. Conveyor belts such as those utilized in the ore mining art have runs of several hundred feet. When belts of this nature break or separate, the runs reverse travel many hundred feet, creating not only a hazard to the working personnel but also adding appreciably to the down time of the conveyor. Such a belt run must be retrieved and returned for repair to the site of the break in a time consuming manner.

The brake device of this invention includes a wedge member which is positioned above the run of the belt in a manner so as not to interfere with the use of the belt in its conveying operation. When a break or separation in a belt run occurs, the wedge member of the brake device is pivoted into contact with the belt run to cause the run to be clamped between the wedge member and a support plate below the belt run, thereby halting rearward motion of the run. In this manner, undesired reverse movement of a belt run can be prevented through a reliable and economic means.

Accordingly, it is an object of this invention to provide a brake device for a conveyor or similar type belt.

Another object of this invention is to provide a brake device which is for a conveyor or similar type belt and which is of reliable operation.

Still another object of this invention is to provide a brake device which is for a conveyor or similar type belt and which is of economical construction.

Other objects of this invention will become apparent upon a reading of the invention's description.

BRIEF DESCRIPTION OF THE DRAWINGS

FIG. 2 is a perspective view of the brake device shown in FIG. 1 with the run of the belt traveling in its normal forward direction.

FIG. 3 is a perspective view of one of the brake devices shown in FIG. 1 shown clamping the run of the belt as it attempts to travel in an undesired reverse direction.

FIG. 4 is a side view of the brake device as shown in FIG. 2 with portions in sectionalized form to illustrate the component parts of the device.

FIG. 5 is a top plan view of the brake device of FIG. 2 with portions of the device broken away for purposes of illustrating the component parts thereof.

FIG. 6 is a side view of the brake device as shown in FIG. 3 with parts thereof in sectionalized form.

FIG. 7 is an elevational end view of the brake device as seen along line 7—7 of FIG. 6.

FIG. 8 is a side view of another embodiment of the brake device of this invention with the belt run shown during its normal forward movement in solid lines and with the device clamping the belt run shown in broken lines.

FIG. 9 is a side view of another embodiment of the brake device of this invention shown in sectionalized form and in clamping engagement with a run of the belt.

FIG. 10 is a side view of the embodiment of the brake device of FIG. 9 shown in sectionalized form with the device positioned to allow forward movement of the belt run.

FIG. 11 is a fragmentary perspective view of another embodiment of the brake device.

DESCRIPTION OF THE PREFERRED EMBODIMENTS

Figure 1:
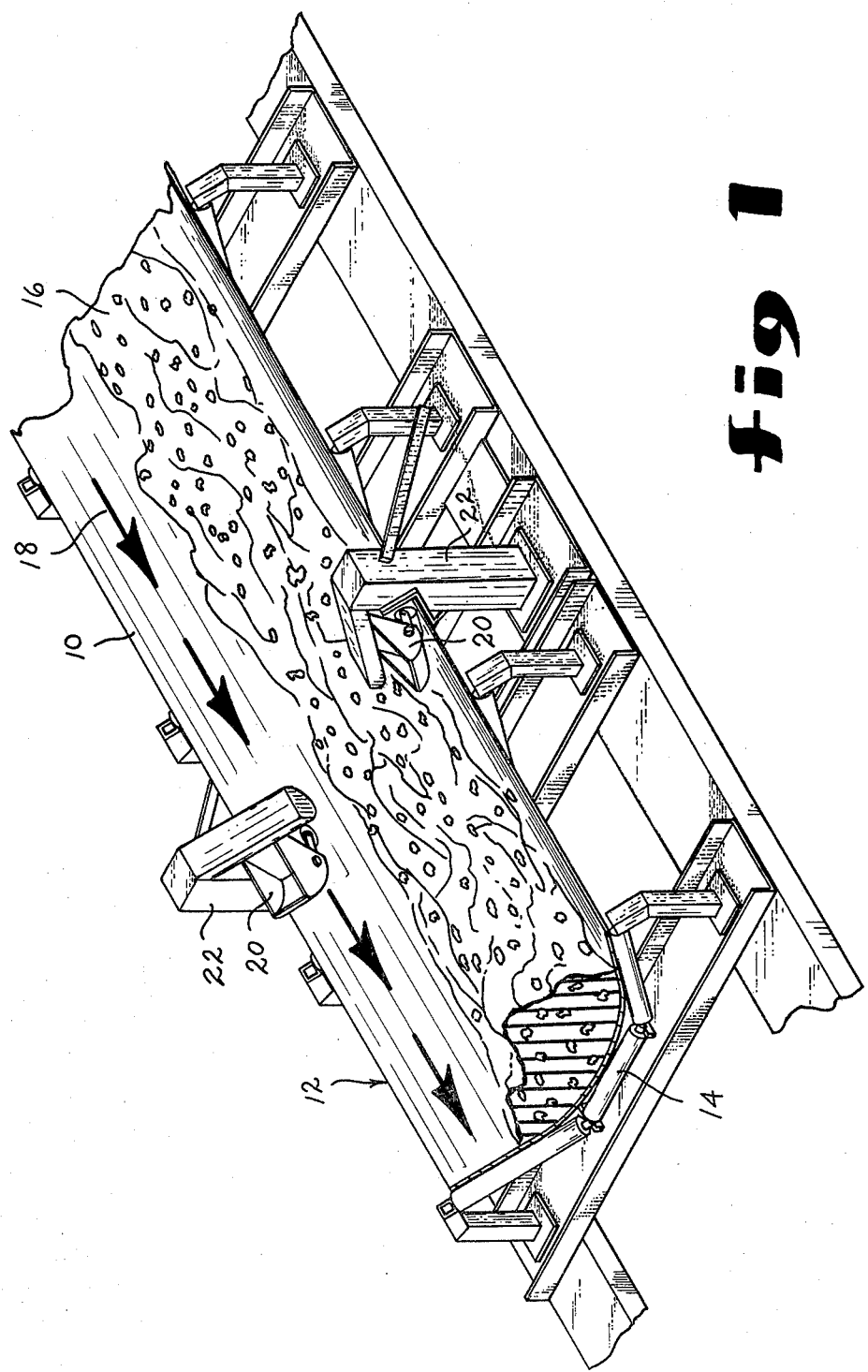
FIG. 1 is a perspective view showing a fragmentary portion of a conveyor belt having one embodiment of the brake device of this invention associated with the belt.

The preferred embodiments illustrated are not intended to be exhaustive or to limit the invention to the precise forms disclosed. They are chosen and described in order to best explain the principles of the invention, its application and practical use to enable others skilled in the art to best utilize the invention.

In FIG. 1, a portion of a conveyor belt system is shown. Run 10 of conveyor belt 12 is supported at spaced intervals by roller assemblies 14. A suitable drive, normally electrically actuated, serves to drive conveyor belt 12. Run 10 the conveyor belt 12 in FIG. 1 is illustrated as carrying a material 16 and is shown as normally traveling in the direction of arrows 18. Run 10 may be 400 to 1200 feet in length and, for purposes of describing the subject invention, is inclined in the direction of normal travel or arrows 18.

A brake device 20 is carried at each side edge of belt run 10. Each brake device 20 is supported by a stanchion 22 with the brake devices being positioned at the side or marginal edges of the belt run 10 so as not to interfere with the conveyance of material 16.

Each brake device 20 illustrated in FIGS. 1–7 includes a wedge member 24 supported between a pair of pivot plates 26. Pivot plates 26 are pivotally connected by a pin 28 to an arm 30 of stanchion 22. A roller 32 is connected by a pair of bracket plates 34 to pivot plates 26. Roller 32 makes frictional contact with belt run 10 and includes an over-running clutch as its journal. The over-running or one way clutch of roller 32 is connected between roller axle 36 and the roller body. One end of each bracket plate 34 is connected to roller axle 36 and its opposite end is pivotally connected to a pin 38 which extends between pivot plates 26 of the brake device. Roller 32 is located to the rear of wedge member 24 and is urged during normal operation of belt 12, that is with the belt run 10 moving in its forward upwardly inclined direction, by a spring 40 toward wedge member 24 with bracket plates 34 contacting steps 42 carried just rearwardly of the trailing edge of the wedge member, as best shown in FIG. 4.

Spring 40 is coiled about pin 38 having its bight portion 44 contacting a center wall 46 which extends between pivot plates 26 from wedge member 24 to pivot pin 28. The end portions of spring 40 are fitted into selected holes 50 within bracket plates 34 to cause spring 40 to urge roller 32 toward wedge member 24. There is preferably a number of holes 50 formed in bracket plates 34 so as to enable the tension of spring 40 to be varied as desired. The clutch part of roller 32 enables the roller to rotate about pin 36 as belt run 10 proceeds in its forward direction as indicated by arrows 18 in FIGS. 1 and 2. With belt run 10 proceeding in its normal forwardly direction, roller 32 of each brake device 20 rides upon the belt run and serves to position wedge member 24 spacedly above the run. A support plate 52 is carried by each stanchion 22 and is positioned under overlying belt run 10 in general alignment with pin 28 which pivotally connects pivot plates 26 to the stanchion arm 30.

Should belt 12 separate or break, run 10 because of its inclined orientation will reverse in movement. When reverse movement of belt run 10 occurs, the one way clutch of roller 32 prevents reverse rotating movement of the roller thereby causing the roller to be drawn rearwardly with the reverse movement of the belt run. The rearward movement of roller 32 causes the roller to be pivoted upwardly about pivot pin 38 with the roller pulling wedge member 24 downwardly into contact with the belt run 10. Roller axle 36 is drawn past the vertical center of pin 28 which journals pivot plates 26 attached to wedge member 24 with the wedge member serving to compress belt run 10 downwardly against support plate 52 as shown in FIGS. 3 and 6, stopping the rearward movement of the belt run. The radial dimension of wedge member 24 from the pivot axis of pin 28 increases from the rear to the front edge 25 of the member so that the greater the force applied by the belt run in its rearward direction of travel to the wedge member the more the wedge member compresses belt run 10 against support plate 52.

In FIGS. 9 and 10, brake device 20 described with respect to FIGS. 1-7 is modified by the inclusion of a kicker 54. After belt 12 has been repaired so as to enable run 10 to proceed in its forward direction, each brake device 20 must be reset so that the pivot axis of roller 32 is located forwardly of the vertical center of pin 28. Due to the normal forward rotational movement of roller 32, this cannot ordinarily be accomplished with regard to the construction of the brake devices 20 illustrated in FIGS. 1-7 except individually by hand. Kicker 54 incorporated with the brake device 20 in FIGS. 9 and 10 allows the brake device to be reset automatically upon recontinued forward movement of belt run 10.

Kicker 54 includes a brake plate 56 which is pivotally connected at one end between pivot plates 26 above roller 32 and which is carried upon a rod 58 at its opposite end. Rod 58 is supported by and depends from stanchion 22. A helical spring 60 encircles rod 58 and is located between stanchion arm 30 and brake plate 56 so as to be placed in compression when wedge member 24 engages and compresses belt run 10 with the brake plate frictionally contacting roller 32, as illustrated in FIG. 9. When belt run 10 is recontinued in its forward direction, rotative movement of roller 32 is substantially prevented due to frictional contact with brake plate 56, thereby causing the roller to be carried forwardly by the belt run until it passes under the vertical center of pivot pin 28. At this time torsion spring 40 will urge roller 32 forwardly until bracket plates 34 contact stops 42 carried by pivot plates 26, thereby positioning wedge member 24 in its upper position as illustrated in FIG. 10.

The brake device 62 illustrated in FIG. 8 includes a wedge member 64 carried by a pair of pivot plates 66 (only one shown). Pivot plates 66 are pivotally connected above belt run 68 to arm 71 of a stanchion 70 by pin 72. A roller 74 is journaled between bracket plates 76 (only one shown) extending from pivot plates 66. Unlike the embodiment of the brake device shown and discussed relative to FIGS. 1-7 and 9-10, roller 74 need not include a one way clutch mechanism. During normal desired movement of belt run 68, as indicated by arrow 78, roller 74 will ride upon the belt run to space wedge member 64 from the belt run. Should there be a slackening in belt run 68, due to belt breakage or separation, or other causes, roller 74 and the belt run will drop by gravity, as illustrated in broken lines, causing wedge member 64 to contact the belt run and to compress the belt run against support 80. Brake device 62 could be used in association with either the upper run of a conveyor belt or its lower run which would go slack should the upper run of the belt separate or break. Thus, brake device 62 would serve as a braking means for the lower run of a conveyor belt while brake device 20 previously described would be utilized as the braking means for the upper run of the conveyor belt.

In many applications of the brake device of this invention, it may be preferable to utilize means other than rollers 32 and 74 as previously described to retain the wedge member of the device in a spaced orientation above the conveyor belt run during normal forward movement of the belt. A trip mechanism or holder engaging the wedge member or its supporting pivot plates can be utilized with such a trip being actuated electrically, hydraulically, pneumatically, or mechanically. One such embodiment involving a trip mechanism is shown in FIG. 11.

Brake device 84 in FIG. 11 includes a wedge member 86 which is carried by a pair of pivot plates 88 and interconnecting wall 90 and which is supported for pivotal movement above run 92 of a conveyor belt by arm 94 of stanchion 96. Brake device 84 in serving its braking function, operates in a manner like that previously described for braking devices 20 and 62 in that upon reverse movement of belt run 92 wedge member 86 will be pivoted into contact with the belt run causing the belt to be compressed between the wedge member and an underlying support plate (not shown). In this illustration the trip mechanism for wedge member 86 is a solenoid 98 which is carried by stanchion 96. Solenoid 98 includes a plunger 100 which in its normal spring biased extended position engages wedge member 86 to retain the wedge member in its raised position above belt run 92. For the purpose of sensing reverse movement of belt run 92, a roller 102 connected to a support shaft 104 is carried below the belt run with the peripheral edge of the roller in frictional contact with the belt run. Upon forward movement of belt run 92 roller 102 will be driven in one direction, and upon reverse movement of the belt run the roller will be driven in the opposite direction. A one way clutch part 106 is carried by shaft 104 in such a manner that upon forward movement of belt run 92 shaft 104 will rotate relative to clutch part 106. Upon reverse movement of belt run 92, shaft 104 by virtue of roller 102 contact with the lower surface of the belt run will cause the engagement of the clutching mechanism of clutch part 106 to cause the clutch part to rotate with the shaft. A sensor mechanism 108 is mounted above clutch part 106. Sensor mechanism 108 senses the presence of metal when brought into its proximity. A control switch is included as a part of sensor mechanism 108 and is connected to solenoid 98. When sensor mechanism 108 senses the presence of a metallic object, it causes its control switch to close and the resulting energizing of solenoid 98. Upon the energizing of solenoid 98, its plunger 100 is withdrawn from engagement with wedge member 86 to allow the wedge member to fall into engaging contact with belt run 92.

Clutch part 106 is formed with a protruding section 110 which when rotated under sensor mechanism 108 causes the sensor mechanism to actuate its control switch. In this manner, reverse rotation of shaft 104 with the resulting rotation of cluth part 106 due to its cluch mechanism causes the energizing of solenoid 98 to permit wedge member 86 to fall into contact with belt run 92. Preferably a spring 112 extends between clutch part 106 and a frame member (not shown) to anchor the clutch part so as to prevent the unintended rotation of the clutch part upon forward movement of belt run 92. During reverse movement of belt run 92, the rotational torque imposed by shaft 104 will overcome the resistance of spring 112 to permit the clutch part to rotate with its protruding section 110 passing in close proximity under sensor mechanism 108 to activate the sensor.

In operation, there will be several brake devices 20, 62, or 84 positioned longitudinally along the run of the conveyor belt. When a trip mechanism, such as that illustrated in FIG. 11, is utilized to retain each wedge member in its elevated position above the belt run during normal forward movement of the belt, a single trip actuator may serve to actuate several such trip mechanisms. Braking devices utilizing trip mechanisms such as that described in FIG. 11 can be reset by hand or, if desired, a suitable lift mechanism can be employed to automatically raise each wedge member to allow snap-fitting engagement with a spring biased trip such as plunger 100 of solenoid 98 once the solenoid has been de-energized. Additionally, with the trip mechanism illustrated in FIG. 11, an electrical power cutoff to sensor mechanism 108 can be employed to allow reverse movement of belt run 92 without the release of wedge member 86 when desired.

It is to be understood that the invention is not to be limited to the details above given, but may be modified within the scope of the appended claims.

What we claim is:

1. A brake device for a belt run having an upper surface, said device comprising a support surface and a wedge member spaced above said support surface, said support surface and said wedge member defining a path therebetween for movement of said belt run, means for directing said wedge member downwardly to compress said belt run against said support surface and into wedging motion-stopping contact with the belt run upper surface upon reverse movement of said belt run, and means associated with said directing means for permitting forward movement of said belt run without wedging contact of the wedge member, said directing means being a pivot part carrying said wedge member, said pivot part being shiftable about a pivot location above said support surface between upper and lower positions wherein said wedge member is movable in an arc from a location spaced from said belt upper surface when said pivot part is in its upper position into a location in said wedging contact with the belt run upper surface when said pivot part is in its lower position, said means permitting forward movement of said belt run being a roller, a bracket journaling said roller and being pivotally connected to said pivot part, said bracket being pivotal relative to the pivot part from a first position locating said roller adjacent said wedge member wherein the roller will ride upon said belt upper surface to locate said pivot part in its upper position and a second position locating said roller more remotely from said wedge member wherein said pivot part is shifted into its said lower position.

2. The brake device of claim 1 and means for preventing rotation of said roller when in contact with said belt run upper surface and upon reverse movement of the belt run.

3. The brake device of claim 2 and biasing means for urging said bracket into its said first position, said biasing means being yieldable upon said reverse belt run movement to permit said bracket to shift into its said lower position.

4. The brake device of claim 3 wherein said biasing means is adjustable to vary the force urging said bracket into its said first position.

5. A brake device for a belt run having an upper surface, said device comprising a support surface and a wedge member spaced above said support surface, said support surface and said wedge member defining a path therebetween for movement of said belt run, means for directing said wedge member downwardly to compress said belt run against said support surface and into wedging motion-stopping contact with the belt run upper surface upon reverse movement of said belt run, and means associated with said directing means for permitting forward movement of said belt run without wedging contact of the wedge member, said directing means being a pivot part carrying said wedge member, said pivot part being shiftable about a pivot location above said support surface between upper and lower positions wherein said wedge member is movable in an arc from a location spaced from said belt upper surface when said pivot part is in its upper position into a location in said wedging contact with the belt run upper surface when said pivot part is in its lower position, said means permitting forward movement of said belt run being a releasable trip means for maintaining said pivot part in its upper position, means for sensing the direction of movement of said belt run to release said trip means upon reverse movement of the belt run, said sensing means being a roller engaging said belt run and a shaft rotatable with said roller, a metallic one way clutch part carried by said shaft, a metallic sensor adjacent said clutch part, said shaft being rotatable relative to said clutch part during forward movement of said belt run, said shaft and clutch part being jointly rotatable upon reverse movement of said belt run wherein said clutch part will pass in proximity of said metallic sensor, said metallic sensor including means for releasing said trip means when the clutch part passes in proximity of the sensor.

* * * * *